United States Patent
Zou et al.

(10) Patent No.: US 11,272,105 B2
(45) Date of Patent: Mar. 8, 2022

(54) IMAGE STABILIZATION CONTROL METHOD, PHOTOGRAPHING DEVICE AND MOBILE PLATFORM

(71) Applicant: SZ DJI TECHNOLOGY CO., LTD, Shenzhen (CN)

(72) Inventors: Wen Zou, Shenzhen (CN); Bing Li, Shenzhen (CN); Xinchao Qu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 100 days.

(21) Appl. No.: 16/539,189

(22) Filed: Aug. 13, 2019

(65) Prior Publication Data

US 2020/0366844 A1    Nov. 19, 2020

Related U.S. Application Data

(63) Continuation of application No. PCT/CN2019/087118, filed on May 15, 2019.

(51) Int. Cl.
*H04N 5/232*    (2006.01)

(52) U.S. Cl.
CPC ..... *H04N 5/23267* (2013.01); *H04N 5/23251* (2013.01)

(58) Field of Classification Search
CPC ........... H04N 5/23229; H04N 5/23251; H04N 5/23254; H04N 5/23258; H04N 5/23264; H04N 5/23267
See application file for complete search history.

(56) References Cited

U.S. PATENT DOCUMENTS

| 9,232,138 | B1* | 1/2016 | Baldwin | H04N 5/2328 |
| 10,674,088 | B2* | 6/2020 | Sun | H04N 5/23258 |
| 2007/0286592 | A1 | 12/2007 | Lee | |
| 2008/0166115 | A1 | 7/2008 | Sachs et al. | |
| 2012/0141101 | A1 | 6/2012 | Cheng et al. | |
| 2017/0041545 | A1 | 2/2017 | Murgia et al. | |
| 2019/0199930 | A1* | 6/2019 | Noguchi | H04N 5/23267 |

FOREIGN PATENT DOCUMENTS

| CN | 101770136 A | 7/2010 |
| CN | 103167237 A | 6/2013 |
| CN | 103685950 A | 3/2014 |
| CN | 105306804 A | 2/2016 |
| CN | 205249350 U | 5/2016 |

(Continued)

OTHER PUBLICATIONS

International Search Report in corresponding International Application No. PCT/CN2019/087118, dated May 15, 2019 (4 pages).

*Primary Examiner* — Lin Ye
*Assistant Examiner* — Chriss S Yoder, III
(74) *Attorney, Agent, or Firm* — Finnegan, Henderson, Farabow, Garrett & Dunner, LLP

(57) ABSTRACT

An image stabilization control method for a photographing device includes obtaining attitude information of the photographing device and a device parameter of the photographing device, and adjusting an image stabilization strength of the photographing device based on the attitude information and the device parameter. The device parameter indicating a brightness of an environment in which the photographing device is located.

18 Claims, 8 Drawing Sheets

(56) References Cited

FOREIGN PATENT DOCUMENTS

| | | |
|---|---|---|
| CN | 108010059 A | 5/2018 |
| CN | 108475075 A | 8/2018 |
| CN | 108521864 A | 9/2018 |
| CN | 109194877 A | 1/2019 |
| JP | 2006-86888 A | 3/2006 |
| JP | 2009244434 A | 10/2009 |
| WO | WO 2019/087118 | 5/2019 |

\* cited by examiner

IMAGE STABILIZATION CONTROL METHOD, PHOTOGRAPHING DEVICE AND MOBILE PLATFORM

CROSS REFERENCE TO RELATED APPLICATION

This application is a continuation application of International Application No. PCT/CN2019/087118, filed on May 15, 2019, the entire content of which is incorporated herein by reference.

TECHNICAL FIELD

The present disclosure relates to the field of photographing and, more particularly, to an image stabilization control method, a photographing device, and a mobile platform.

BACKGROUND

When a camera is used for photographing, if the camera vibrates during the shooting or the camera is mounted at a rapidly moving device (e.g., an unmanned aerial vehicle), a relative movement of a target object for photographing to the camera during the shooting will be too fast, causing motion blurring in the images captured by the camera and degrading image quality.

Currently, methods of electronic image stabilization and optical image stabilization are often used to reduce the blurring of images. The electronic image stabilization mainly refers to forcibly raising the sensitivity of the photosensitive element (e.g., charge coupled device or CCD) and simultaneously increasing a shutter speed. In addition, the images obtained by the CCD are analyzed, and peripheral image compensation is used to reduce the blurring. The electronic image stabilization is actually a technique to reduce the image quality to compensate the blurring.

If the camera is shooting in an environment with poor lighting or sharp light contrast, an exposure time may be lengthened and camera sensitivity (ISO) may be increased to maintain a reasonable image brightness. As a result, captured images are more likely to suffer motion blurring. Under the circumstance, if the electronic image stabilization is enabled on the camera to suppress the motion blurring, the blurring of the images may be worsened, and the image quality may be further degraded.

SUMMARY

In accordance with the disclosure, there is provided an image stabilization control method for a photographing device including obtaining attitude information of the photographing device and a device parameter of the photographing device, and adjusting an image stabilization strength of the photographing device based on the attitude information and the device parameter. The device parameter indicating a brightness of an environment in which the photographing device is located.

Also in accordance with the disclosure, there is provided a photographing device including a memory storing program instructions and a processor configured to execute the program instructions to obtain attitude information of the photographing device and a device parameter of the photographing device, and adjust an image stabilization strength of the photographing device based on the attitude information and the device parameter. The device parameter indicating a brightness of an environment in which the photographing device is located.

DETAILED DESCRIPTION OF THE EMBODIMENTS

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

It should be noted that, in some embodiments, when one component is "fixedly connected" or "connected" to another component, or one component is "fixed" to another component, the component may directly contact the another component, or may not directly contact the another component and may have something in-between.

Unless otherwise specified, all the technical and scientific terms used in the embodiments of the present disclosure refer to the same meaning commonly understood by those skilled in the art. The terminologies used in the present disclosure are intended to describe specific embodiments, and not to limit the scope of the present disclosure. The term "and/or" includes any and all combinations of one or more of the listed items.

The present disclosure provides an evaluation method of image feature points and a mobile platform. The mobile platform may be an unmanned aerial vehicle, an unmanned vessel, an unmanned automobile, or a robot, etc. The unmanned aerial vehicle may be a rotorcraft, such as a multi-rotor aircraft propelled by a plurality of air propelling devices. The form of the mobile platform is not limited by the present disclosure.

Figure 1:
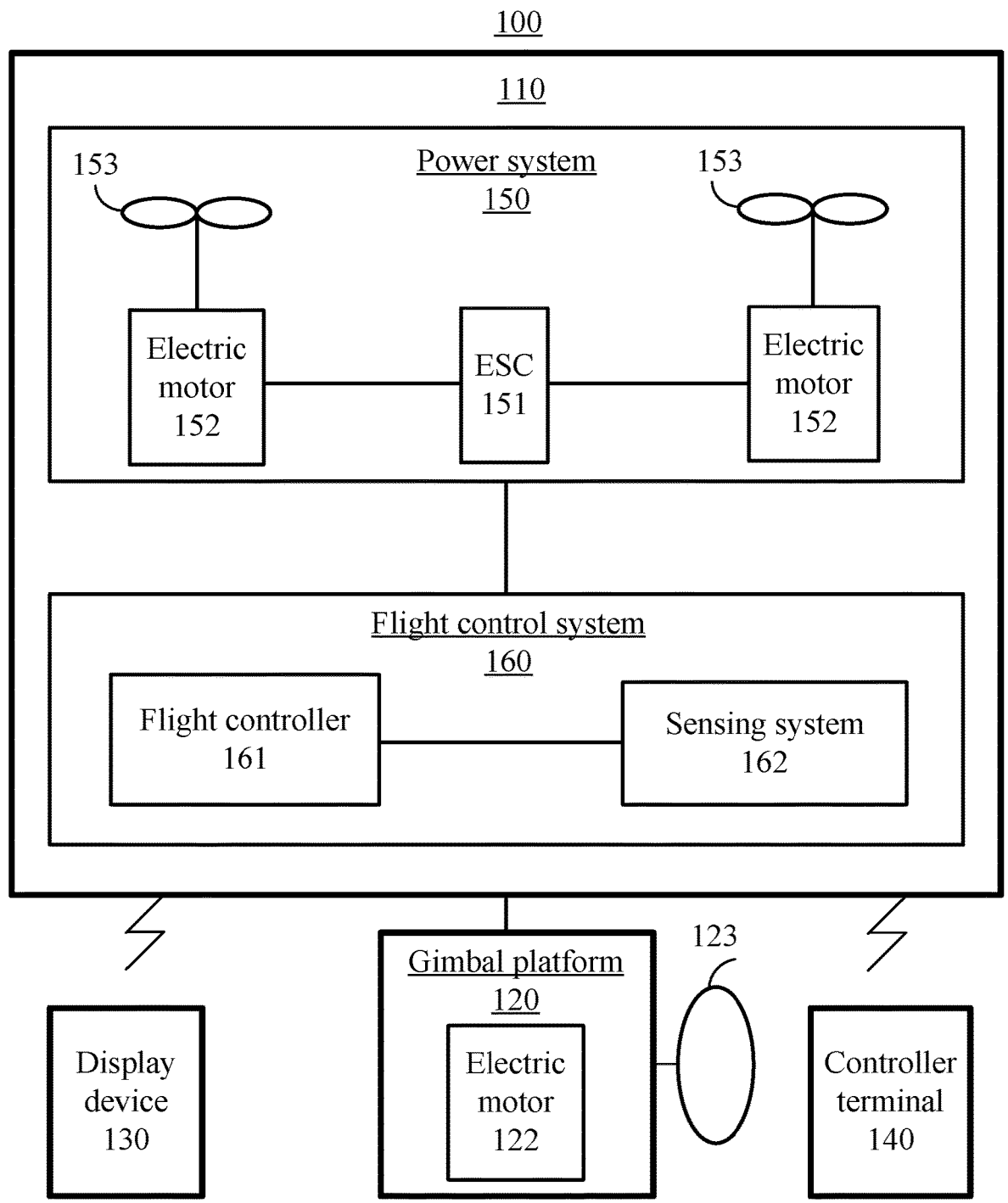
FIG. 1 is a schematic architectural diagram of an unmanned flying system according to an example embodiment.

FIG. 1 is a schematic architectural diagram of an unmanned flying system consistent with embodiments of the present disclosure. For illustrative purposes, a rotor-based unmanned aerial vehicle will be used in the description of the embodiments.

As shown in FIG. 1, the unmanned flying system 100 includes an unmanned aerial vehicle 110, a display device 130, and a controller terminal 140. The unmanned aerial vehicle 110 includes a power system 150, a flight control system 160, an aerial vehicle rack (not shown), and a gimbal platform 120 mounted at the aerial vehicle rack. The unmanned aerial vehicle 110 may wirelessly communicate with the controller terminal 140 and the display device 130, respectively.

The aerial vehicle rack may include a fuselage and one or more stands (also known as landing gear). The fuselage may include a center frame and one or more vehicle arms coupled to the center frame. The one or more vehicle arms extend radially from the center frame. The one or more stands are connected to the fuselage and is configured to support the unmanned aerial vehicle 110 when it is landed.

The power system 150 includes one or more electronic governors (also referred to as electronic speed controller, "ESC") 151, one or more propellers 153, and one or more electric motors 152 corresponding to the one or more propellers 153. An electric motor 152 is coupled between a corresponding electronic governor 151 and a corresponding propeller 153. The one or more electric motors 152 and the one or more propellers 153 are mounted at the one or more vehicle arms. The one or more electronic governors 151 are configured to receive driving signals generated by the flight control system 160 and supply driving currents to the one or more electric motors 152 based on the driving signals to control rotation speeds of the one or more electric motors 152. The one or more electric motors 152 are configured to drive the one or more propellers 153 to rotate to provide power for the unmanned aerial vehicle 110 to fly. As such, the unmanned aerial vehicle 110 can move freely in one or more dimensions.

In some embodiments, the unmanned aerial vehicle 110 may rotate around one or more rotational axes. For example, the rotational axes may include a roll axis, a yaw axis, and a pitch axis. The one or more electric motors 152 may be direct current (DC) electric motors or alternate current (AC) electric motors. In addition, the one or more electric motors 152 may be brushless electric motors or brushed electric motors.

The fight control system 160 includes a flight controller 161 and a sensing system 162. The sensing system 162 is configured to measure attitude information of the unmanned aerial vehicle 110, including spatial position information and state information of the unmanned aerial vehicle 110, such as a three-dimensional position, a three-dimensional angle, a three-dimensional speed, a three-dimensional acceleration, and a three-dimensional angular velocity, etc. The sensing system 162 may include at least one of a gyroscope, an ultrasonic sensor, an electronic compass, an inertial measurement unit (IMU), a visual sensor, a global navigation satellite system device, or a barometer. For example, the global navigation satellite system may be the global positioning system (GPS).

The flight controller 161 is configured to control the flight of the unmanned aerial vehicle 110. For example, the flight controller 162 may control the flight of the unmanned aerial vehicle 110 based on the attitude information measured by the sensing system 162. The flight controller 161 may control the unmanned aerial vehicle 110 according to pre-programmed program instructions or in response to one or more control commands received from the control terminal 140.

The gimbal platform 120 includes an electric motor 122. The gimbal platform 120 is configured to hold the photographing device 123. The flight controller 161 may control the electric motor 122 to move the gimbal platform 120. In some embodiments, the gimbal platform 120 may also include a gimbal controller configured to control the electric motor 122 to move the gimbal platform 120.

The gimbal platform 120 may be operated independent of the unmanned aerial vehicle 110 or may be an integral part of the unmanned aerial vehicle 110. The electric motor 122 may be a DC electric motor or an AC electric motor. Further, the electric motor 122 may be a brushless electric motor or a brushed electric motor. The gimbal platform may be disposed on the top of the unmanned aerial vehicle 110 or at the bottom of the unmanned aerial vehicle 110.

In some embodiments, the photographing device 123 may be a camera or a camcorder configured to capture images. The photographing device 123 may communicate with the flight controller 161 and perform photographing under the control of the flight controller 161. In some embodiments, the photographing device 123 includes at least a photosensitive component. For example, the photosensitive component may be a complementary metal oxide semiconductor (CMOS) sensor or a charge-coupled device (CCD) sensor. The photographing device 123 may also be directly attached to the unmanned aerial vehicle 110, thereby eliminating the gimbal platform 120.

The display device 130 is located at a ground terminal of the unmanned flying system 100, wirelessly communicates with the unmanned aerial vehicle 110, and displays the attitude information of the unmanned aerial vehicle 110. Further, the display device 130 displays images captured by the photographing device 123. The display device may be a standalone device or an integral part of the control terminal 140.

The controller terminal 140 is located at the ground terminal of the unmanned flying system 100, wirelessly communicates with the unmanned aerial vehicle 110, and is configured to remotely control the unmanned aerial vehicle 110.

Various parts of the unmanned flying system 100 are named for the purpose of identification. The naming should not be construed as limiting the embodiments of the present disclosure.

Therefore, the unmanned aerial vehicle 110 may recognize and track an object in the images captured by the photographing device 123.

Figure 2:
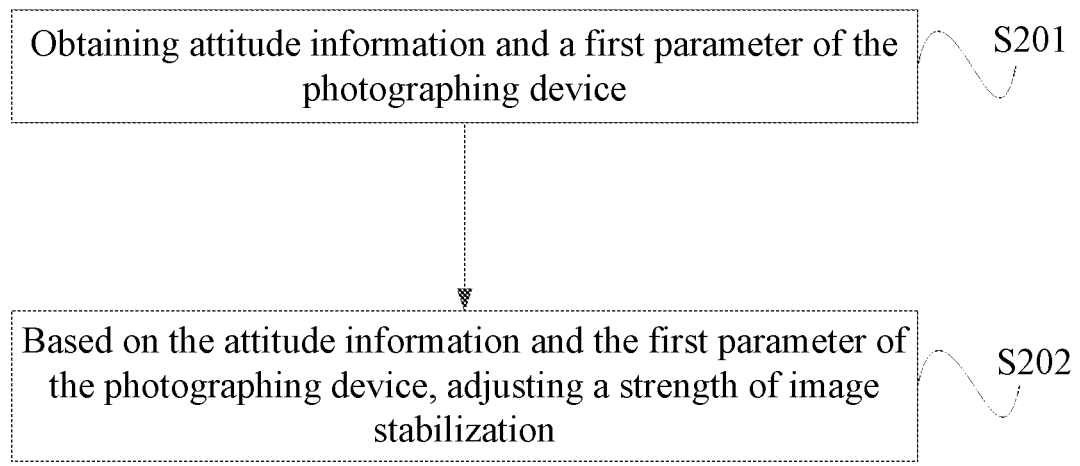
FIG. 2 is an illustrative flowchart of an image stabilization control method according to an example embodiment.

FIG. 2 is an illustrative flowchart of an image stabilization control method according to embodiments of the present disclosure. The method can be implemented by a photographing device. The photographing device can include a camera, a camcorder, or another image-capturing device. As shown in FIG. 2, the method includes the following processes.

At S201, attitude information and a first parameter of the photographing device are obtained, where the first parameter indicates ambient brightness of the photographing device, i.e., a parameter indicating the brightness of the environment in which the photographing device is located. The first parameter of the photographing device is also referred to as a device parameter of the photographing device.

In some embodiments, when the photographing device is shooting a target object, an image of the target object in a photograph captured by the photographing device may depend on a position or an angle of the photographing device shooting the photograph. As such, when vibration occurs to the photographing device during the shooting to cause blurring in the photograph, vibration information of the photographing device, such as a direction or an angle of the vibration, may be obtained to determine a rotation angle of the image of the target object captured in the photograph caused by the vibration of the photographing device. Based on the rotation angle of the image of the target object captured in the photograph, the photographing device can stabilize the image in the photograph and reduce the blurring in the photograph. Therefore, the photographing device needs to obtain the attitude information of the photographing device to stabilize the image in the motion-blurred photograph and to reduce the blurring in the photograph.

In some embodiments, the photographing device obtains the attitude information thereof through the IMU or based on the image captured by the photographing device. The implementation of obtaining the attitude information through the IMU or based on the image captured by the photographing device will not be repeated herein.

Moreover, the photographing device can obtain the first parameter thereof for indicating the ambient brightness of the photographing device to further obtain the ambient brightness of the photographing device based on the first parameter of the photographing device.

The ambient brightness of the photographing device may be represented directly by the ambient brightness or indirectly by an exposure parameter. In some embodiments, the first parameter includes at least one of the exposure parameter or the ambient brightness. In some embodiments, the exposure parameter includes at least one of an exposure time, an ISO value, or an exposure amount. For example, in an environment of poor ambient light, the exposure time of the photographing device increases, or the ISO value increases. Thus, the ambient brightness of the photographing device may be represented by the exposure time or the ISO value. For example, a mapping relationship between the exposure time and the ambient brightness may be established. Each exposure time corresponds to an ambient brightness. Similarly, a mapping relationship between the ISO value and the ambient brightness may be established. Each ISO value corresponds to an ambient brightness.

In some embodiments, the ambient brightness may be obtained by obtaining a photometry matrix of the photographing device based on the image captured by the photographing device and then obtaining the ambient brightness based on the photometry matrix. In some embodiments, the photometry matrix may be obtained through an automatic exposure (AE) function of the photographing device. Because of the relationship between the photometry matrix and the ambient brightness, the ambient brightness is obtained based on the photometry matrix.

In some embodiments, the photographing device stores exposure parameters (e.g., the exposure time, the ISO value, the exposure amount) at the time of shooting. Thus, the exposure parameters at the time the image is captured are directly obtained from the photographing device. For example, the exposure parameters at the time the image is captured may be obtained from the exposure parameters of N preceding photographs or the exposure parameters of M succeeding photographs, where N and M are positive integers and N may be equal to M.

At S202, the attitude information of the photographing device and the first parameter of the photographing device are used to adjust a strength of image stabilization, also referred to as an "image stabilization strength."

In some embodiments, the strength of the image stabilization is related to the attitude information and the ambient brightness of the photographing device. The ambient brightness of the photographing device is represented by the first parameter. Thus, the attitude information and the first parameter of the photographing device are used to adjust the strength of the image stabilization. The strength of the image stabilization will be described in detail below.

Figure 3A:
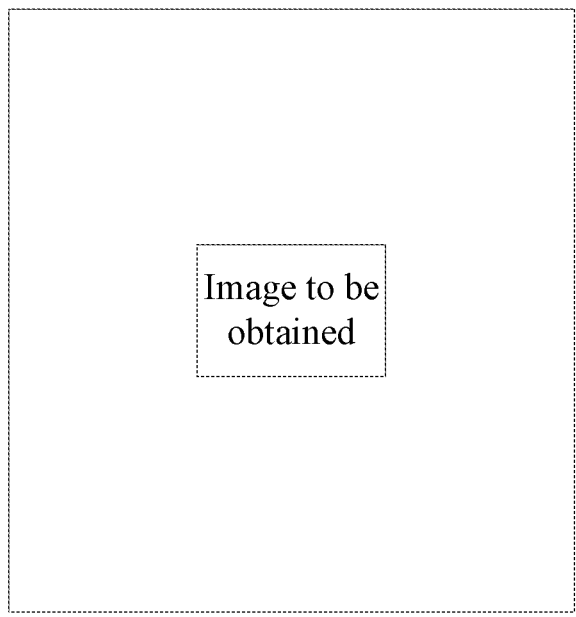
FIG. 3A is a normally shot image according to an example embodiment.
Figure 3B:
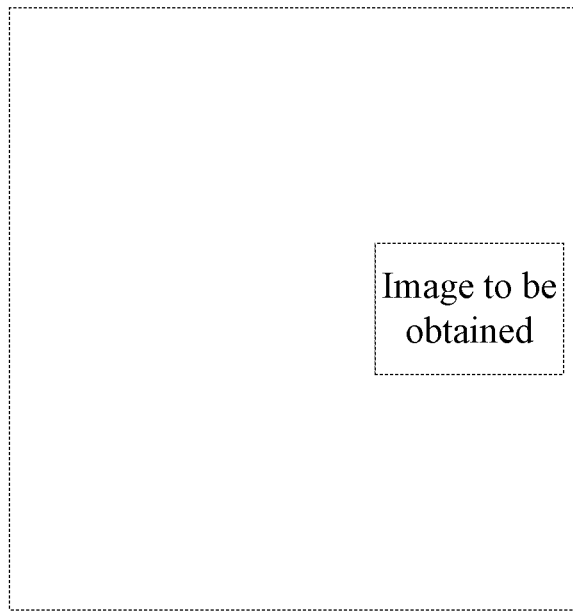
FIG. 3B is a motion blurred image corresponding to the image in FIG. 3A.

FIG. 3A is a normally shot image consistent with embodiments of the present disclosure. FIG. 3B is a motion blurred image corresponding to the image in FIG. 3A. As shown in FIG. 3A and FIG. 3B, the outer rectangular frames represent the photographs taken by the photographing device, respectively. An image of a target object is supposed to be located at the center of the photograph. As shown in FIG. 3A, no vibration of the photographing device occurs, and the image of the target object is located at the center of the photograph taken by the photographing device. However, if vibration of the photographing device occurs, the image of the target object may move away from the center of the photograph taken by the photographing device.

For example, if the photographing device moves horizontally to the right, the image of the target object moves horizontally to the left of the center of the photograph taken by the photographing device. If the photographing device moves to the upper left, the image of the target object moves to the lower right of the center of the photograph taken by the photographing device. That is, the image of the target object moves in an opposite direction that the vibrating photographing device moves, and a distance that the image of the target object moves is proportional to a distance that the vibrating photographing device moves. If the movement of the vibrating photographing device is relatively large, the image of the target object may completely disappear from the photograph taken by the photographing device. For illustrative purposes, in the example shown in FIG. 3B, the photographing device moves horizontally to the left and the image of the target object moves horizontally to the right of the center of the photograph taken by the photographing device.

When no vibration occurs to the photographing device, the image of the target object is located at the center of the photograph taken by the photographing device. If the photographing device moves horizontally to the left, the image of the target object moves horizontally to the right of the center of the photograph taken by the photographing device. For example, the electronic stabilization (i.e., image stabilization) obtains the image as much as possible from the photograph taken by the photographing device that moves horizontally to the left.

A movement direction and a movement distance of the vibrating photographing device may be obtained from the attitude information of the photographing device to determine which movement direction and how much movement distance with respect to the center of the photograph taken by the photographing device that moves horizontally to the left should be applied to obtain the image of the target object. Without considering the effect of the ambient brightness of the photographing device on the strength of the image stabilization, the strength of the image stabilization is dependent only on the movement direction and/or the movement distance of the vibrating photographing device. In other words, the movement direction and the movement distance with respect to the center of the photograph taken by the photographing device that moves horizontally to the left are only dependent on the movement direction and/or the movement distance of the vibrating photographing device.

However, the ambient brightness of the photographing device does affect the photograph taken by the photographing device. Without considering the ambient brightness of the photographing device in the image stabilization, the image stabilized photograph may suffer more severe blurring. Thus, the ambient brightness of the photographing device is required to adjust the strength of the image stabilization.

For example, as shown in FIG. 3A and FIG. 3B, when only the attitude information is used to adjust the strength of the image stabilization, to obtain the stabilized image, the strength of the image stabilization is about 1.0 distance unit horizontally to the right with respect to the center of the photograph taken by the photographing device that moves horizontally to the left. When both the attitude information and the ambient brightness of the photographing device are used to adjust the strength of the image stabilization, to obtain the stabilized image, the strength of the image stabilization is about 0.8 distance unit horizontally to the right or about 1.1 distance unit to the upper-right with respect to the center of the photograph taken by the photographing device that moves horizontally to the left, where an offset angle is dependent on the attitude information and the ambient brightness of the photographing device.

A pixel in the image of the target object in FIG. 3B is selected as an origin point, a horizontal axis corresponding to the movement direction and a vertical axis corresponding to the movement distance form a Cartesian coordinate system. The movement direction and the movement distance are required to obtain the stabilized image.

Figure 4:
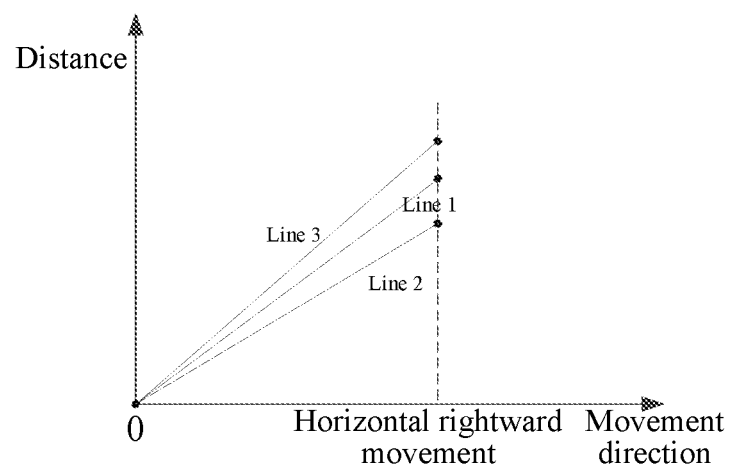
FIG. 4 is a Cartesian coordinate diagram of image stabilization strength according to an example embodiment.

FIG. 4 is a Cartesian coordinate diagram of image stabilization strength consistent with embodiments of the present disclosure. As shown in FIG. 4, for illustrative purposes, a horizontal rightward movement with respect to the center of the photograph is described. Line 1 represents that the horizontal rightward movement is about 1.0 distance unit in the case that only the attitude information is considered. That is, only the attitude information is used to adjust the strength of the image stabilization. Line 2 represents that the horizontal rightward movement is about 0.8 distance unit in the case that both the attitude information and the ambient brightness of the photographing device being about 1.0 brightness unit are considered. That is, both the attitude information and the ambient brightness of the photographing device being about 1.0 brightness unit are used to adjust the strength of the image stabilization. Line 3 represents that the horizontal rightward movement is about 1.1 distance unit in the case that both the attitude information and the ambient brightness of the photographing device being about 2.0 brightness unit are considered. That is, both the attitude information and the ambient brightness of the photographing device being about 2.0 brightness unit are used to adjust the strength of the image stabilization. Thus, adjusting the strength of the image stabilization based on the attitude information and the ambient brightness of the photographing device is illustrated in the Cartesian coordinate system in FIG. 4 as a slope of an adjustment line incorporating both the attitude information and the ambient brightness of the photographing device.

The movement direction is dependent on the attitude information and the ambient brightness of the photographing device. Changes of the movement distances in a specific movement direction are illustrated in FIG. 4.

Figure 5A:
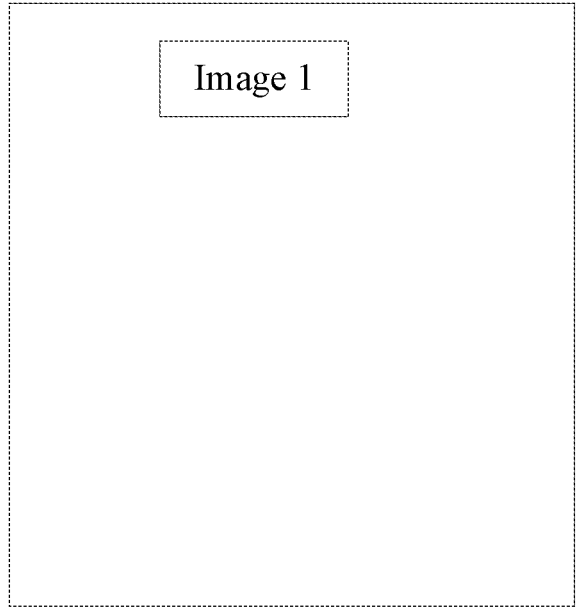
FIG. 5A is an image captured at time t1 by a photographing device according to an example embodiment.
Figure 5B:
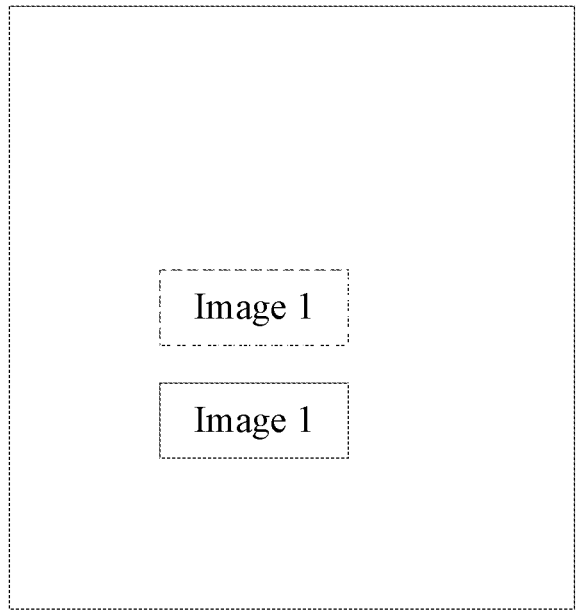
FIG. 5B is an image captured at time t2 by a photographing device corresponding to FIG. 5A according to an example embodiment.
Figure 5C:
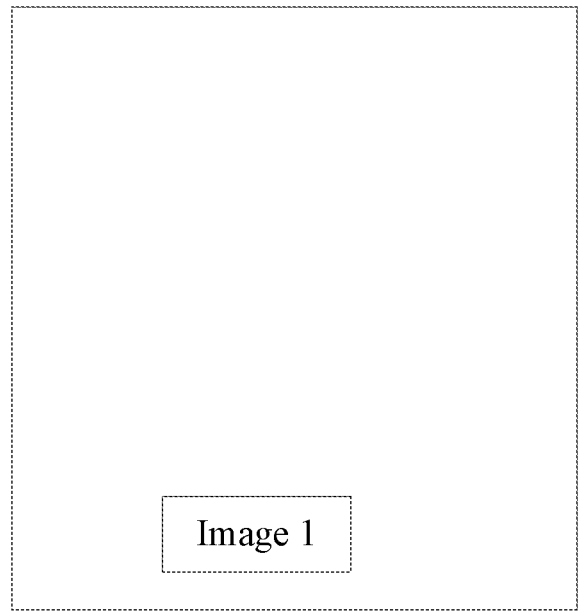
FIG. 5C is an image captured at time t3 by a photographing device corresponding to FIG. 5A according to an example embodiment.

FIG. 5A is an image captured at time t1 by a photographing device consistent with embodiments of the present disclosure. FIG. 5B is an image captured at time t2 by the photographing device consistent with embodiments of the present disclosure. FIG. 5C is an image captured at time t3 by the photographing device consistent with embodiments of the present disclosure. t1, t2, and t3 are equally separated.

For example, the photographing device moves horizontally at a constant speed while shooting a video. Image 1 uniformly changes positions in the photographs captured by the photographing device at the time t1, the time t2, and the time t3. That is, a difference between the image 1 in the photograph captured by the photographing device at the time t2 and the image 1 in the photograph captured by the photographing device at the time t1 is approximately equal to a difference between the image 1 in the photograph captured by the photographing device at the time t3 and the image 1 in the photograph captured by the photographing device at the time t2. If the vibration of the photographing device occurs at the time t2 or the movement speed and/or movement direction of the photographing device changes, the difference between the image 1 in the photograph captured by the photographing device at the time t2 and the image 1 in the photograph captured by the photographing device at the time t1 can be different from the difference between the image 1 in the photograph captured by the photographing device at the time t3 and the image 1 in the photograph captured by the photographing device at the time t2.

As shown in FIG. 5A, FIG. 5B, and FIG. 5C, image blurring occurs to the video comprising the photographs in FIG. 5A, FIG. 5B, and FIG. 5C, causing uncomfortable viewing experience. For illustrative purposes, FIG. 5B shows the photograph captured by the photographing device that changes the movement speed at the time t2. As shown in FIG. 5B, the dash line frame represents the position of the image 1 in the photograph captured by the photographing device if no vibration occurs to the photographing device at the time t2 and no change of the movement speed and/or movement direction occurs to the photographing device at the time t2. Thus, the image 1 represented by the solid line frame in FIG. 5B may need to be moved. For FIG. 5A, FIG. 5B, and FIG. 5C, the image 1 represented by the solid line frame in FIG. 5B needs to be adjusted upward. For example, the adjustment may be vertically upward or left leaning upward. The upward movement direction and the movement distance are dependent on the attitude information and the ambient brightness of the photographing device. That is, the attitude information and the ambient brightness of the photographing device are used to adjust the strength of the image stabilization.

In some embodiments, the strength of the image stabilization of the photographing device after the adjustment is positively correlated to the ambient brightness of the photographing device.

In some embodiments, the positive correlation includes that the strength of the image stabilization increases as the ambient brightness of the photographing device increases and decreases as the ambient brightness of the photographing device decreases. The positive correlation further includes that the strength of the image stabilization remains unchanged if the change of the ambient brightness of the photographing device is within a pre-set brightness range.

For example, the strength of the image stabilization may include a plurality of levels, such as high, low, and off. The ambient brightness of the photographing device may be divided into a plurality of brightness ranges corresponding to the plurality of levels of the strength of the image stabilization. For example, a threshold 1 and a threshold 2 are set. The ambient brightness smaller than or equal to the threshold 1 is brightness range 1, corresponding to the "off" level. The ambient brightness greater than the threshold 1 and smaller than or equal to the threshold 2 is brightness range 2, corresponding to the "low" level. The ambient brightness greater than the threshold 2 is brightness range 3, corresponding to the "high" level.

When the ambient brightness of the photographing device changes within the brightness range 1, the strength of the image stabilization remains unchanged. When the ambient brightness changes from another brightness range to a value in the brightness range 1, the strength of the image stabilization is set to 0. That is, the image stabilization is turned off. When the ambient brightness of the photographing device changes within the brightness range 2 and the brightness range 3, the strength of the image stabilization changes accordingly. However, when the ambient brightness of the photographing device changes by a same amount, the strength of the image stabilization may change by a different amount.

The first parameter includes at least one of the ambient brightness, the exposure time, the ISO value, or the exposure amount. When the attitude information and the first parameter of the photographing device are used to adjust the strength of the image stabilization, at least one of the ambient brightness, the exposure time, the ISO value, or the exposure amount may be included in the first parameter according to the actual requirements. For example, the exposure time alone or the ambient brightness alone or both the exposure time and the ambient brightness may be included in the first parameter, which is not limited by the present disclosure.

For illustrative purposes, in the description below of an adjustment process of the strength of the image stabilization, the exposure time alone is used as the first parameter.

Figure 6:
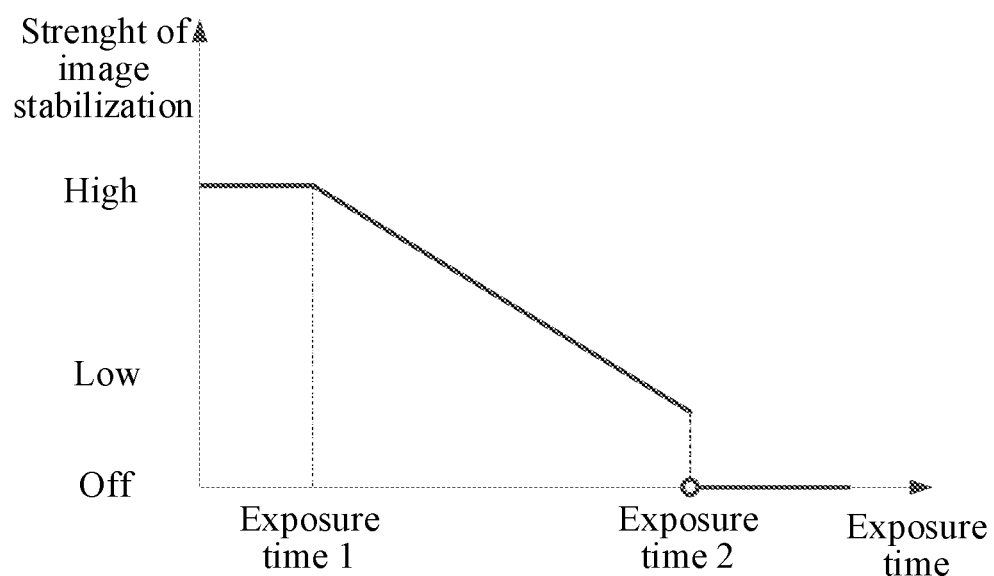
FIG. 6 is a schematic diagram of an adjustment process of a strength of the image stabilization according to an example embodiment.

FIG. 6 is a schematic diagram of an adjustment process of a strength of the image stabilization consistent with embodiments of the present disclosure. As shown in FIG. 6, the strength of the image stabilization includes the "high" level, the "low" level, and the "off" level. When the exposure time is smaller than or equal to a pre-set exposure time 1, the strength of the image stabilization is at the "high" level. As the exposure time increases, the strength of the image stabilization remains unchanged. When the exposure time is greater than the pre-set exposure time 1 and smaller than or equal to a pre-set exposure time 2, the strength of the image stabilization is at the "low" level. Because the exposure time is negatively correlated to the ambient brightness, as the exposure time increases, the strength of the image stabilization decreases. When the exposure time is greater than the pre-set exposure time 2, it indicates a substantially poor ambient brightness and the blurring of the photographs may be worsened if the image stabilization using the electronic image stabilization technology is turned on. Thus, the electronic image stabilization is turned off and the strength of the image stabilization is 0.

In some embodiments, the attitude information and the first parameter of the photographing device are obtained. The first parameter includes the ambient brightness of the photographing device. The attitude information and the first parameter of the photographing device are used to adjust the strength of the image stabilization of the photographing device. The photographing device adjusts the strength of the image stabilization based on the attitude information and the ambient brightness of the photographing device, such that the strength of the image stabilization of the photographing device corresponds to the ambient brightness of the photographing device. For each level of the ambient brightness, the strength of the image stabilization corresponding to the ambient brightness reduces the blurring of the photographs captured under the ambient brightness and improves photograph quality.

In some embodiments, S202 may be implemented by adjusting the strength of the image stabilization of the photographing device based on the attitude information and the first parameter of the photographing device if the first parameter satisfies a pre-set condition for adjusting the strength of the image stabilization.

In some embodiments, after the first parameter indicating the ambient brightness of the photographing device is obtained and before the strength of the image stabilization is adjusted, it is required to determine whether the first parameter satisfies the pre-set condition for adjusting the strength of the image stabilization. For example, the pre-set condition for adjusting the strength of the image stabilization may include the strength of the image stabilization corresponding to the first parameter being at a different level from that of the current strength of the image stabilization. That is, the ambient brightness indicated by the first parameter is in a brightness range different from that of the ambient brightness corresponding to the current strength of the image stabilization. Therefore, if the condition is satisfied, the attitude information and the first parameter of the photographing device are used to adjust the strength of the image stabilization.

In another example, the pre-set condition for adjusting the strength of the image stabilization may include a pre-set amount of change of the first parameter. If the amount of change of the first parameter of the photographing device is greater than or equal to the pre-set amount of change of the first parameter, the attitude information and the first parameter of the photographing device are used to adjust the strength of the image stabilization.

In some embodiments, before the strength of the image stabilization is adjusted, whether the first parameter of the photographing device satisfies the pre-set condition for adjusting the image stabilization is determined. If the pre-set condition for adjusting the strength of the image stabilization is satisfied, the strength of the image stabilization is adjusted. Thus, constant adjustment of the strength of the image stabilization of the photographing device in response to the changes of the first parameter of the photographing device is avoided, amount of processing by the photographing device is reduced, and power consumption of the photographing device is reduced.

For example, if only a single video frame in a video shot by the photographing device needs blurring reduction, the first parameter at the time the video frame is captured is considered. However, in the case that ambient lighting changes substantially, the strength of the image stabilization is in the adjustment process. If only the first parameter corresponding to the video frame is used to adjust the strength of the image stabilization, the blurring reduction may not be effective. In some embodiments, obtaining the first parameter may be implemented by obtaining a plurality of consecutive video frames captured by the photographing device, obtaining the first parameters of the plurality of consecutive video frames, and obtaining the first parameter of the photographing device by aggregating the obtained first parameters of the plurality of consecutive video frames. In the present disclosure, a first parameter corresponding to a video frame is also referred to as a "frame parameter."

In some embodiments, the first parameter includes the exposure time. For example, the video frames include a first frame, a second frame, a third frame, a fourth frame, a fifth frame, . . . , an Nth frame. The exposure times of the first frame, the second frame, and the third frame are obtained to process the image blurring in the sixth frame. Based on the exposure times corresponding to the first frame, the second frame, and the third frame, respectively, an average exposure time is calculated. The average exposure time is treated as the exposure time corresponding to the sixth frame.

In another example, a weighted average exposure time is calculated based on the exposure times corresponding to the ninth frame and the tenth frame, respectively. The weighted average exposure time is treated as the exposure time corresponding to the sixth frame. As such, even if the environment represented by the first parameter of a single video frame differs from reality, the adjustment of the strength of the image stabilization is still consistent with the actual ambient brightness. Thus, the effectiveness of the blurring reduction is improved.

If the plurality of consecutive video frames are distant from the current video frame, then the first parameter for the current video frame obtained based on the first parameters corresponding to the plurality of consecutive video frames may greatly differ from an actual first parameter of the current video frame. In some embodiments, the plurality of consecutive video frames may be a plurality of consecutive video frames preceding the current video frame and/or a plurality of consecutive video frames succeeding the current video frame. Correspondingly, obtaining the first parameter of the photographing device may be implemented by obtaining the first parameter of the photographing device corresponding to the current video frame. Correspondingly, adjusting the strength of the image stabilization of the photographing device may be implemented by adjusting the strength of the image stabilization of the photographing device corresponding to the current vide frame.

For example, reducing the image blurring in the sixth video frame may include calculating the weighted average exposure time of the exposure times corresponding to the first video frame through the tenth video frame, respectively, or the weighted average exposure time of the exposure times corresponding to the third video frame through the tenth video frame, respectively, and using the weighted average exposure time as the exposure time corresponding to the sixth video frame. Then, the attitude information and the weighted average exposure time are used to adjust the strength of the image stabilization corresponding to the sixth video frame. As such, the first parameter corresponding to the current video frame is calculated based on the first parameters corresponding to the plurality of consecutive video frames preceding the current video frame and/or the plurality of consecutive video frames succeeding the current video frame, respectively. Thus, the first parameter corresponding to the current vide frame is more realistic and can better represent the actual environment. The adjusted strength of the image stabilization is more effective in reducing the image blurring in the current video frame. In some embodiments, the attitude information and the exposure time of the tenth video frame can be used to adjust the strength of the image stabilization corresponding to the sixth video frame.

Figure 7:
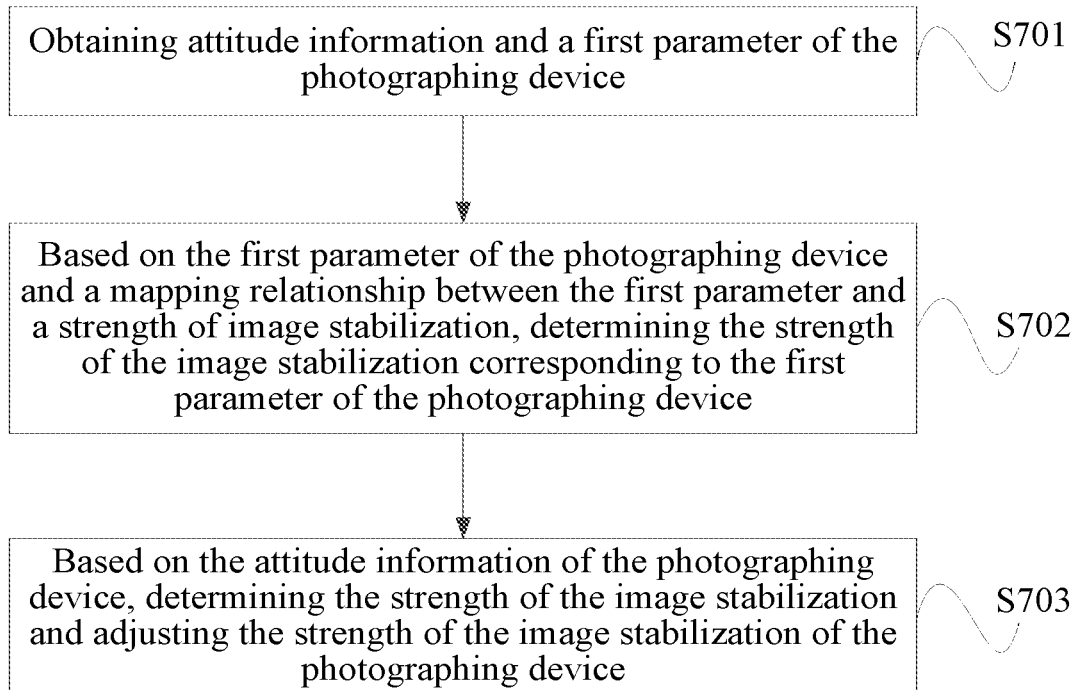
FIG. 7 is an illustrative flowchart of another image stabilization control method according to an example embodiment.

FIG. 7 is an illustrative flowchart of another image stabilization control method consistent with embodiments of the present disclosure. The image stabilization control method is based on the image stabilization control method in FIG. 2 and includes the following processes.

At S701, attitude information and a first parameter of a photographing device are obtained.

S701 is similar to S201 and description thereof will not be repeated herein.

At S702, a strength of the image stabilization corresponding to the first parameter of the photographing device is determined based on the first parameter of the photographing device and a mapping relationship between the first parameter and the strength of the image stabilization.

In some embodiments, the mapping relationship between the first parameter of the photographing device and the strength of the image stabilization may be pre-set. For example, each value of the first parameter corresponds to a value of the strength of the image stabilization. In another example, the valid range of the first parameter is divided into a plurality of parameter segments and the valid range of the strength of the image stabilization is divided into a plurality of levels. Each parameter segment corresponds to a level. The level of the strength of the image stabilization is determined based on the parameter segment that includes the first parameter.

Within each parameter segment (i.e., each level), the strength of the image stabilization remains unchanged. Alternatively, each first parameter in the parameter segment corresponds to a same level of the strength of the image stabilization. After the first parameter of the photographing device is obtained, the mapping relationship between the first parameter and the strength of the image stabilization is used to determine the strength of the image stabilization corresponding to the first parameter of the photographing device.

At S703, based on the attitude information of the photographing device, the strength of the image stabilization of the photographing device is determined and adjusted.

In some embodiments, after the strength of the image stabilization corresponding to the first parameter of the photographing device is determined, the already obtained attitude information of the photographing device is further used to adjust the strength of the image stabilization of the photographing device.

In some embodiments, the mapping relationship between the first parameter and the strength of the image stabilization is established. After the first parameter is obtained, the mapping relationship is used to directly determine the strength of the image stabilization corresponding to the first parameter, such that the first parameter and the attitude information are used to adjust the strength of the image stabilization. The strength of the image stabilization of the photographing device corresponds to the ambient brightness of the photographing device. For each level of the ambient brightness, the strength of the image stabilization corresponding to the ambient brightness reduces the blurring of the photographs captured under the ambient brightness and improves photograph quality.

Figure 8:
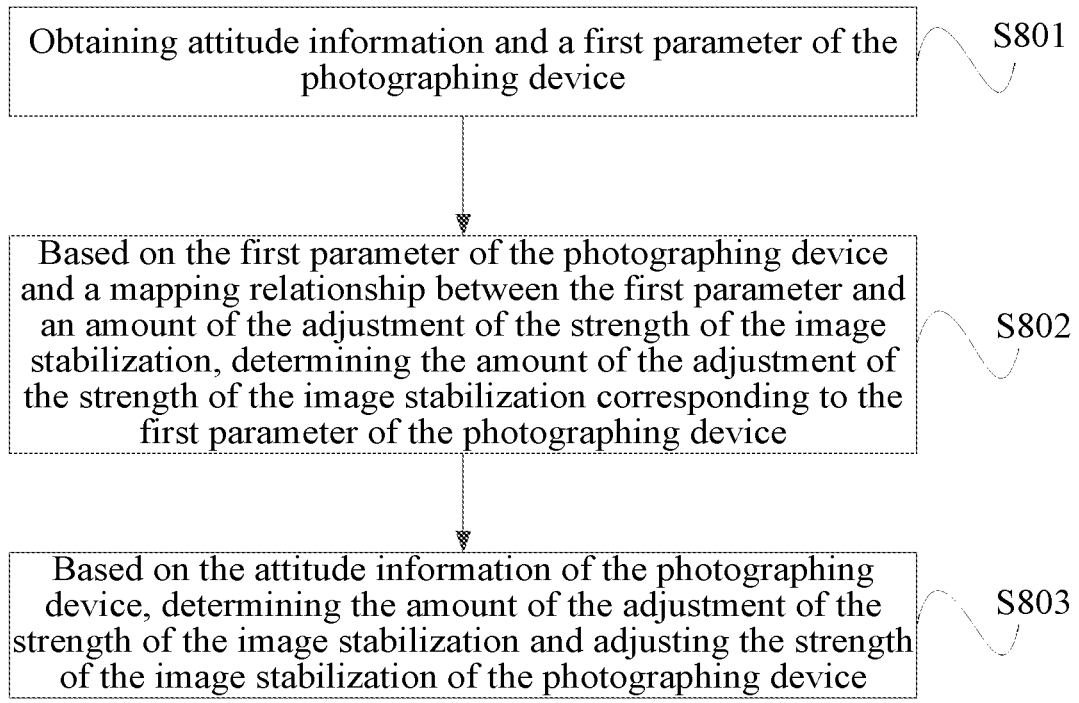
FIG. 8 is an illustrative flowchart of another image stabilization control method according to an example embodiment.

FIG. 8 is an illustrative flowchart of another image stabilization control method consistent with embodiments of the present disclosure. The image stabilization control method is based on the image stabilization control methods in FIG. 2 and FIG. 7 and includes the following process.

At S801, attitude information and a first parameter of a photographing device are obtained.

S801 is similar to S201 and description thereof will not be repeated herein.

At S802, an adjustment amount of a strength of the image stabilization corresponding to the first parameter of the photographing device is determined based on the first parameter of the photographing device and a mapping relationship between the first parameter and the adjustment amount of the strength of the image stabilization.

In some embodiments, the strength of the image stabilization before the adjustment is recorded as the current strength of the image stabilization. After the first parameter of the photographing device is obtained, the strength of the image stabilization corresponding to the first parameter is recorded as the adjusted strength of the image stabilization. An amount of adjustment is a difference between the adjusted strength of the image stabilization and the current strength of the image stabilization.

For example, the difference between the adjusted strength of the image stabilization and the current strength of the image stabilization may be pre-determined. Thus, a mapping relationship between the first parameter of the photographing device and the amount of adjustment of the strength of the image stabilization may be established in advance. After the first parameter of the photographing device is obtained, based on the mapping relationship between the first parameter and the amount of adjustment of the strength of the image stabilization, the current strength of the image stabilization and the determined amount of adjustment of the strength of the image stabilization are used to determine the strength of the image stabilization corresponding to the first parameter of the photographing device.

At S803, based on the attitude information of the photographing device, the determined amount of adjustment of the strength of the image stabilization of the photographing device, the strength of the image stabilization of the photographing device is adjusted.

In some embodiments, after the strength of the image stabilization corresponding to the first parameter of the photographing device is determined, the already obtained attitude information of the photographing device is further used to adjust the strength of the image stabilization of the photographing device.

In some embodiments, the mapping relationship is established between the first parameter and the amount of adjustment of the strength of the image stabilization. After the first parameter is obtained, the mapping relationship is used to determine the strength of the image stabilization corresponding to the first parameter, such that the first parameter and the attitude information are used to adjust the strength of the image stabilization. The strength of the image stabilization of the photographing device corresponds to the ambient brightness of the photographing device. For each level of the ambient brightness, the strength of the image stabilization corresponding to the ambient brightness reduces the blurring of the photographs captured under the ambient brightness and improves photograph quality.

Figure 9:
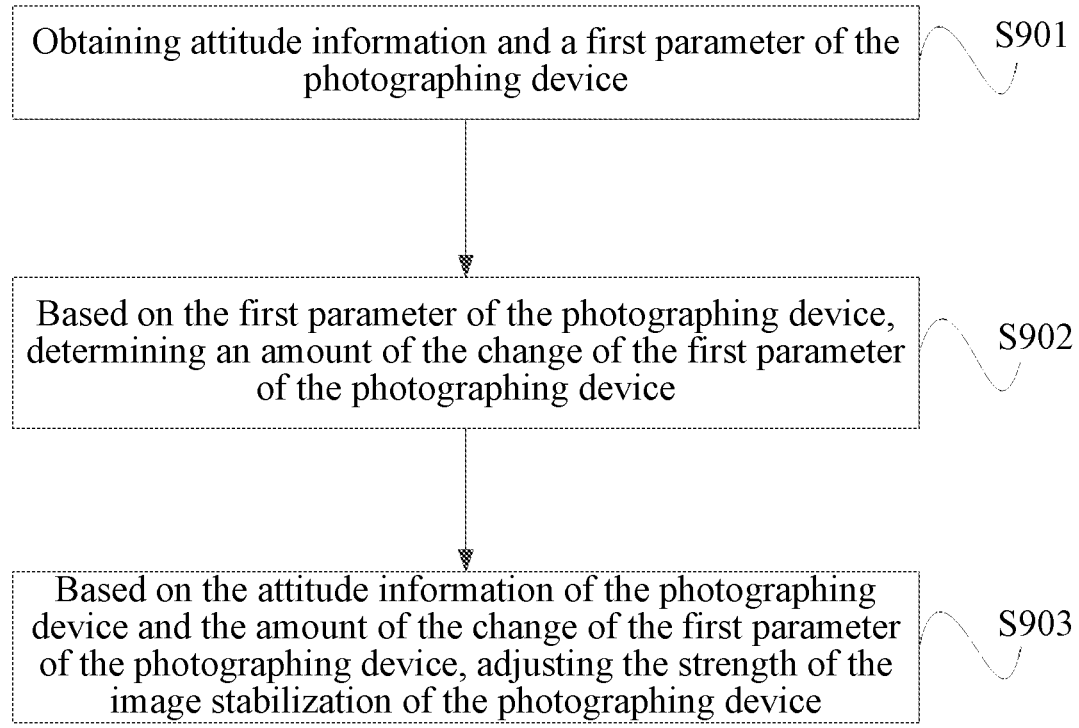
FIG. 9 is an illustrative flowchart of another image stabilization control method according to an example embodiment.

FIG. 9 is an illustrative flowchart of another image stabilization control method consistent with embodiments of the present disclosure. The image stabilization control method is based on the image stabilization control methods in FIG. 2, FIG. 7, and FIG. 8 and includes the following processes.

At S901, attitude information and a first parameter of a photographing device are obtained.

S901 is similar to S201 and description thereof will not be repeated herein.

At S902, an amount of change of the first parameter is determined based on the first parameter of the photographing device.

In some embodiments, after the first parameter of the photographing device is obtained, the amount of change of the first parameter may be determined. For example, determining the amount of change of the first parameter may be implemented by obtaining the first parameter corresponding to the current strength of the image stabilization and comparing the first parameter with the first parameter corresponding to the current strength of the image stabilization to calculate the amount of change of the first parameter with respect to the first parameter corresponding to the current strength of the image stabilization. The amount of change of the first parameter with respect to the first parameter corresponding to the current strength of the image stabilization is used to determine the adjusted strength of the image stabilization.

At S903, the strength of the image stabilization of the photographing device is adjusted based on the attitude information of the photographing device and the amount of change of the first parameter of the photographing device.

In some embodiments, after the first parameter is obtained, the amount of change of the first parameter with respect to the first parameter corresponding to the current strength of the image stabilization is used to determine the adjusted strength of the image stabilization. Thus, after the strength of the image stabilization corresponding to the first parameter of the photographing device is determined, the already obtained attitude information of the photographing device is further used to adjust the strength of the image stabilization of the photographing device.

In some embodiments, the amount of change of the first parameter of the photographing device and the attitude information of the photographing device are used to adjust the strength of the image stabilization of the photographing device, such that the first parameter and the attitude information are used to adjust the strength of the image stabilization. The strength of the image stabilization of the photographing device corresponds to the ambient brightness of the photographing device. For each level of the ambient brightness, the strength of the image stabilization corresponding to the ambient brightness reduces the blurring of the photographs captured under the ambient brightness and improves photograph quality.

The present disclosure further provides a computer readable storage medium. The computer readable storage medium stores program instructions. When being executed, the program instructions implement part of or the entire image stabilization control method consistent with the present disclosure.

Figure 10:
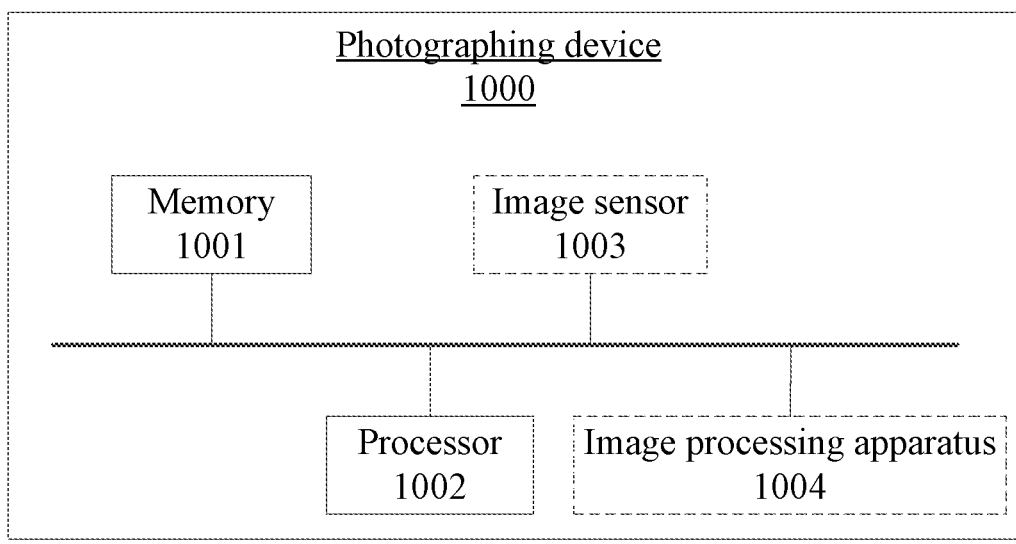
FIG. 10 is a schematic structural diagram of a photographing device according to an example embodiment.

FIG. 10 is a schematic structural diagram of a photographing device consistent with embodiments of the present disclosure. As shown in FIG. 10, the photographing device 1000 includes a memory 1001 configured to store program instructions and a processor 1002 configured to execute the program instructions stored in the memory 1001 to obtain attitude information of the photographing device 1000 and a first parameter of the photographing device 1000, and based on the attitude information of the photographing device 1001 and the first parameter of the photographing device 1000, adjust a strength of image stabilization of the photographing device 1000. The first parameter indicates ambient brightness of the photographing device 1000.

In some embodiments, the photographing device 1000 further includes an image sensor 1003 configured to obtain a plurality of consecutive video frames captured by the photographing device and an image processing apparatus 1004 configured to obtain the first parameters of the plurality of consecutive video frames and to obtain the first parameter of the photographing device based on the first parameters of the plurality of consecutive video frames.

In some embodiments, the adjusted strength of the image stabilization of the photographing device 1000 is positively correlated with the ambient brightness of the photographing device 1000.

In some embodiments, the first parameter includes at least one of an exposure parameter or an ambient brightness. In some embodiments, the exposure parameter includes at least one of an exposure time, an ISO value, or an exposure amount.

In some embodiments, the plurality of consecutive video frames includes a plurality of consecutive video frames preceding a current video frame and/or a plurality of consecutive video frames succeeding the current video frame.

Obtaining the first parameter of the photographing device 1000 by the processor 1002 can be implemented by obtaining the first parameter corresponding to the current video frame of the photographing device 1000. Adjusting the strength of the image stabilization of the photographing device 1000 by the processor 1002 can be implemented by adjusting the strength of the image stabilization corresponding to the current video frame of the photographing device 1000.

In some embodiments, adjusting the strength of the image stabilization of the photographing device by the processor 1002 based on the attitude information of the photographing device 1000 and the first parameter of the photographing device 1000 is implemented by: determining the strength of the image stabilization corresponding to the first parameter of the photographing device 1000 based on the first parameter of the photographing device 1000 and a mapping relationship between the first parameter and the strength of the image stabilization; and adjusting the strength of the image stabilization of the photographing device 1000 based on the attitude information of the photographing device 1000 and the determined strength of the image stabilization.

In some embodiments, adjusting the strength of the image stabilization of the photographing device by the processor 1002 based on the attitude information of the photographing device 1000 and the first parameter of the photographing device 1000 is implemented by: determining an amount of adjustment of the strength of the image stabilization corresponding to the first parameter of the photographing device 1000 based on the first parameter of the photographing device 1000 and a mapping relationship between the first parameter and the amount of adjustment of the strength of the image stabilization; and adjusting the strength of the image stabilization of the photographing device 1000 based on the attitude information of the photographing device 1000 and the determined amount of adjustment of the strength of the image stabilization.

In some embodiments, adjusting the strength of the image stabilization of the photographing device by the processor 1002 based on the attitude information of the photographing device 1000 and the first parameter of the photographing device 1000 is implemented by: determining an amount of change of the first parameter of the photographing device 1000 based on the first parameter of the photographing device 1000; and adjusting the strength of the image stabilization of the photographing device 1000 based on the attitude information of the photographing device 1000 and the amount of change of the first parameter of the photographing device 1000.

In some embodiments, adjusting the strength of the image stabilization of the photographing device by the processor 1002 based on the attitude information of the photographing device 1000 and the first parameter of the photographing device 1000 is implemented by: if the first parameter of the photographing device 1000 satisfies a pre-set condition for adjusting the strength of the image stabilization, adjusting the strength of the image stabilization of the photographing device 1000 based on the attitude information of the photographing device 1000 and the first parameter of the photographing device 1000.

In some embodiments, if the first parameter includes the ambient brightness, obtaining the first parameter of the photographing device by the processor 1002 is implemented by: obtaining a photometry matrix of the photographing device 1000 based on images captured by the image sensor 1003 of the photographing device 1000; and obtaining the ambient brightness based on the photometry matrix.

In some embodiments, obtaining the attitude information of the photographing device 1000 by the processor 1002 is implemented by: obtaining the attitude information of the photographing device 1000 through an inertial measurement unit (IMU); or obtaining the attitude information of the photographing device 1000 based on the images captured by the image sensor 1003 of the photographing device 1000.

The photographing device 1000 according to the present disclosure may be configured to perform the technical solutions of the foregoing method embodiments. The operation principle and the technical benefits thereof are similar and will not be repeated herein.

Figure 11:
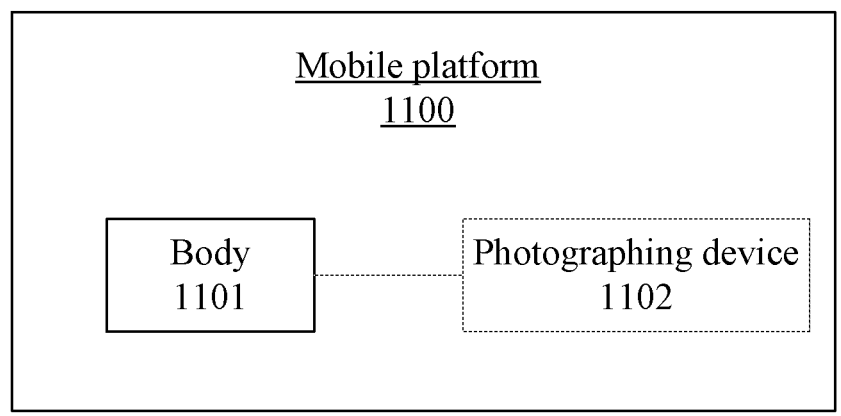
FIG. 11 is a schematic structural diagram of a mobile platform according to an example embodiment.

FIG. 11 is a schematic structural diagram of a mobile platform consistent with embodiments of the present disclosure. As shown in FIG. 11, the mobile platform 1100 includes a body 1101 and a photographing device 1102. The photographing device 1102 may include any structure of the photographing device 1000 in FIG. 10. Correspondingly, the photographing device 1102 may perform any technical solution shown in FIG. 2, FIG. 7, FIG. 8, and FIG. 9. The operation principle and the technical benefits thereof are similar and will not be repeated herein.

In some embodiments, the photographing device 1102 may be mounted at the body 1101 directly or through a gimbal platform, which is not limited by the present disclosure.

The embodiments of the present disclosure may be implemented entirely or partially by software, hardware, firmware, or any combination thereof. When implemented in software, the embodiments of the present disclosure may be implemented entirely or partially in the form of a computer program product. The computer program product may include one or more computer program instructions. Executing the computer program instructions on a computer may entirely or partially produce the flow chart process or functions according to the embodiments of the present disclosure. The computer may be a general-purpose computer, a specialized computer, a computer network, or other programmable devices. The computer program instructions may be stored in a computer readable storage medium or may be transferred from one computer readable storage medium to another computer readable storage medium. For example, the computer program instructions may be transferred from one network node, one computer, one server, or one data center to another network node, another computer, another server, or another data center through a wired (e.g., coaxial cable, optical fiber, digital subscriber line) or wireless (e.g., infrared, radio, microwave, etc.) communication method. The computer readable storage medium may include any computer accessible usable medium or one or more of data storage equipment such as usable medium integrated servers or data centers. The usable medium may include a magnetic medium (e.g., a floppy disk, a hard disk, a magnetic tape), or a semiconductor medium (e.g., solid state disk), etc.

The phrase "one embodiment," "some embodiments," or "other embodiments" in the specification means that the particular features, structures, or characteristics related to the embodiments are included in at least one embodiment of the present disclosure. Thus, they are not intended to be the same embodiment. In addition, these particular features, structures, or characteristics may be combined in any suitable manner in one or more embodiments.

In various embodiments of the present disclosure, sequence numbers of the processes have nothing to do with the order of execution sequence. Instead, the order of executing the processes should be determined by functions and intrinsic logics. The sequence numbers should not limit the implementation of the embodiments of the present disclosure.

In various embodiments of the present disclosure, the phrase "B corresponding to A" can mean that B is associated with A and/or B can be determined according to A. However, determining B from A does not mean that B is determined only based on A, but B can be determined based on A and/or other information.

The term "and/or" herein is merely an association relationship describing associated objects, representing three relationships. For example, A and/or B may represent an existence of A only, an existence of B only, and a co-existence of both A and B. In addition, the character "/" in the specification generally represents that the associated objects have an "or" relationship.

Those skilled in the art will appreciate that the elements and algorithm steps described in various embodiments of the present disclosure can be implemented in electronic hardware or a combination of computer software and electronic hardware. Whether a function is implemented in hardware or software may be determined by specific application and design constraints of the particular solution. Those skilled in the art may use different methods to implement a function described in the specification depending on each specific application. However, such implementation should not be considered to be beyond the scope of the present disclosure.

Those skilled in the art may clearly understand that, for convenience and brevity, detailed operation process of systems, devices and sub-systems may refer to corresponding process previously described in the embodiments and may not be repeated.

In the embodiments of the present disclosure, the disclosed systems, devices and methods may be implemented in other manners. For example, the device embodiments described above are merely illustrative. For example, the division of sub-systems may be only a logical function division. In practical applications, sub-systems may be divided differently. For example, multiple sub-systems or components may be combined or integrated into another system. Certain features may be omitted or not executed. Further, mutual coupling, direct coupling, or communication connection shown or discussed may be implemented by certain interfaces. Indirect coupling or communication connection of devices or sub-systems may be electrical, mechanical, or in other forms.

Sub-systems described as separated components may or may not be physically separated. A sub-system shown as a separate component may or may not be a physically separated sub-system. That is, the sub-system may be located in one place or may be distributed in multiple network elements. According to practical applications, all or a portion of sub-systems may be implemented to achieve the objectives of the embodiments of the present disclosure.

In addition, functional sub-systems described in different embodiments of the present disclosure may be integrated into one processing sub-system or may exist physically separately. Two or more sub-systems may be integrated into one sub-system.

The foregoing descriptions are merely some implementation manners of the present disclosure, but the scope of the present disclosure is not limited thereto. Any change or replacement that can be conceived by a person skilled in the art based on the technical scope disclosed by the present application should be covered by the scope of the present disclosure. A true scope and spirit of the invention is indicated by the following claims.

What is claimed is:

1. An image stabilization control method for a photographing device, the method comprising:
    obtaining attitude information of the photographing device and a device parameter of the photographing device, the device parameter indicating a brightness of an environment in which the photographing device is located; and
    adjusting, based on the attitude information and the device parameter, an image stabilization strength of the photographing device,
    wherein the image stabilization strength after being adjusted is positively correlated with the brightness of the environment.

2. The method of claim 1, wherein:
    the device parameter includes at least one of an exposure parameter of the photographing device or an ambient brightness.

3. The method of claim 1, wherein obtaining the device parameter includes:
    obtaining a plurality of consecutive video frames captured by the photographing device;
    obtaining frame parameters of the plurality of consecutive video frames; and
    obtaining the device parameter based on the frame parameters of the plurality of consecutive video frames.

4. The method of claim 3, wherein:
    the plurality of consecutive video frames includes at least one of:
        a plurality of consecutive video frames preceding a current video frame, or
        a plurality of consecutive video frames succeeding the current video frame;
    obtaining the device parameter includes obtaining the frame parameter corresponding to the current video frame as the device parameter; and
    adjusting the image stabilization strength includes adjusting an image stabilization strength corresponding to the current video frame.

5. The method of claim 1, wherein adjusting the image stabilization strength of the photographing device includes:
    determining an image stabilization strength corresponding to the device parameter based on:
        the device parameter, and
        a mapping relationship between parameters and image stabilization strengths; and adjusting the image stabilization strength of the photographing device based on the attitude information and the determined image stabilization strength corresponding to the device parameter.

6. The method of claim 1, wherein adjusting the image stabilization strength of the photographing device includes:
determining an adjustment amount of the image stabilization strength corresponding to the device parameter based on:
the device parameter, and
a mapping relationship between parameters and adjustment amounts of image stabilization strength; and
adjusting the image stabilization strength of the photographing device based on the attitude information and the determined adjustment amount.

7. The method of claim 1, wherein adjusting the image stabilization strength of the photographing device includes:
determining a change amount of the device parameter based on the device parameter; and
adjusting the image stabilization strength of the photographing device based on the attitude information and the change amount.

8. The method of claim 1, wherein adjusting the image stabilization strength of the photographing device includes:
adjusting the image stabilization strength of the photographing device based on the attitude information and the device parameter in response to the device parameter satisfying a pre-set condition for adjusting the image stabilization strength.

9. The method of claim 1, wherein:
the device parameter includes an ambient brightness; and
obtaining the device parameter includes:
obtaining a photometry matrix of the photographing device based on one or more images captured by the photographing device, and
obtaining the ambient brightness based on the photometry matrix.

10. A photographing device comprising:
a memory storing program instructions; and
a processor configured to execute the program instructions to:
obtain attitude information of the photographing device and a device parameter of the photographing device, the device parameter indicating a brightness of an environment in which the photographing device is located; and
adjust, based on the attitude information and the device parameter, an image stabilization strength of the photographing device,
wherein the image stabilization strength after being adjusted is positively correlated with the brightness of the environment.

11. The photographing device of claim 10, wherein:
the device parameter includes at least one of an exposure parameter of the photographing device or an ambient brightness.

12. The photographing device of claim 10, further comprising:
an image sensor configured to obtain a plurality of consecutive video frames captured by the photographing device,
wherein the processor is further configured to obtain the device parameter by:
obtaining frame parameters of the plurality of consecutive video frames, and
obtaining the device parameter based on the frame parameters of the plurality of consecutive video frames.

13. The photographing device of claim 12, wherein:
the plurality of consecutive video frames include at least one of:
a plurality of consecutive video frames preceding a current video frame, or
a plurality of consecutive video frames succeeding the current video frame; and
the processor is configured to:
obtain the device parameter by obtaining the frame parameter corresponding to the current video frame as the device parameter, and
adjust the image stabilization strength by adjusting an image stabilization strength corresponding to the current video frame.

14. The photographing device of claim 10, wherein the processor is configured to adjust the image stabilization strength by:
determining an image stabilization strength corresponding to the device parameter based on:
the device parameter, and
a mapping relationship between parameters and image stabilization strengths; and
adjusting the image stabilization strength of the photographing device based on the attitude information and the determined image stabilization strength corresponding to the device parameter.

15. The photographing device of claim 10, wherein the processor is configured to adjust the image stabilization strength by:
determining an adjustment amount of the image stabilization strength corresponding to the device parameter based on:
the device parameter, and
a mapping relationship between parameters and adjustment amounts of image stabilization strength; and
adjusting the image stabilization strength of the photographing device based on the attitude information and the determined adjustment amount.

16. The photographing device of claim 10, wherein the processor is configured to adjust the image stabilization strength by:
determining a change amount of the device parameter based on the device parameter; and
adjusting the image stabilization strength of the photographing device based on the attitude information and the change amount.

17. The photographing device of claim 10, wherein the processor is configured to adjust the image stabilization by:
adjusting the image stabilization strength of the photographing device based on the attitude information and the device parameter in response to the device parameter satisfying a pre-set condition for adjusting the image stabilization strength.

18. The photographing device of claim 10, wherein:
the device parameter includes an ambient brightness; and
the processor is configured to obtain the device parameter by:
obtaining a photometry matrix of the photographing device based on one or more images captured by the photographing device, and
obtaining the ambient brightness based on the photometry matrix.

* * * * *